(12) United States Patent
Youngquist et al.

(10) Patent No.: US 11,303,823 B2
(45) Date of Patent: Apr. 12, 2022

(54) CAMERA ARRAY FOR A MEDIATED-REALITY SYSTEM

(71) Applicant: eLoupes, Inc., Seattle, WA (US)

(72) Inventors: James Andrew Youngquist, Seattle, WA (US); David Julio Colmenares, Seattle, WA (US); Adam Gabriel Jones, Seattle, WA (US)

(73) Assignee: Proprio, Inc., Seattle, WA (US)

( * ) Notice: Subject to any disclaimer, the term of this patent is extended or adjusted under 35 U.S.C. 154(b) by 75 days.

(21) Appl. No.: 16/808,194

(22) Filed: Mar. 3, 2020

(65) Prior Publication Data

US 2020/0204741 A1  Jun. 25, 2020

Related U.S. Application Data

(63) Continuation of application No. 16/582,855, filed on Sep. 25, 2019, now Pat. No. 10,623,660.

(60) Provisional application No. 62/737,791, filed on Sep. 27, 2018.

(51) Int. Cl.
| | |
|---|---|
| *H04N 5/247* | (2006.01) |
| *H04N 5/225* | (2006.01) |
| *G06T 7/521* | (2017.01) |
| *G06T 7/557* | (2017.01) |
| *G02B 3/00* | (2006.01) |
| *G06T 7/50* | (2017.01) |
| *H04N 13/243* | (2018.01) |
| *G06T 19/00* | (2011.01) |

(52) U.S. Cl.
CPC .......... *H04N 5/247* (2013.01); *G02B 3/0056* (2013.01); *G06T 7/50* (2017.01); *G06T 7/521* (2017.01); *G06T 7/557* (2017.01); *G06T 19/006* (2013.01); *H04N 5/2252* (2013.01); *H04N 5/2258* (2013.01); *H04N 13/243* (2018.05); *G06T 2207/10028* (2013.01); *G06T 2207/10052* (2013.01)

(58) Field of Classification Search
CPC ...................................................... H04N 5/247
USPC ........................................................ 348/47
See application file for complete search history.

(56) References Cited

U.S. PATENT DOCUMENTS

| | | | |
|---|---|---|---|
| 9,503,709 B2 | 11/2016 | Shi et al. | |
| 2013/0335600 A1* | 12/2013 | Gustavsson | H04N 5/2258 348/239 |

(Continued)

FOREIGN PATENT DOCUMENTS

| | | |
|---|---|---|
| CN | 204854653 U | 12/2015 |
| WO | WO2018/097831 A1 | 5/2018 |

OTHER PUBLICATIONS

PCT International Search Report and Written Opinion, PCT Application No. PCT/US19/53300, dated Dec. 19, 2019, 15 pages.

*Primary Examiner* — Yulin Sun
(74) *Attorney, Agent, or Firm* — Fenwick & West LLP (57) ABSTRACT

A camera array for a mediated-reality system includes a plurality of hexagonal cells arranged in a honeycomb pattern in which a pair of inner cells include respective edges adjacent to each other and a pair of outer cells are separated from each other by the inner cells. A plurality of cameras are mounted within each of the plurality of hexagonal cells. The plurality of cameras include at least one camera of a first type and at least one camera of a second type. The camera of the first type may have a longer focal length than the camera of the second type.

20 Claims, 5 Drawing Sheets

(56) References Cited

U.S. PATENT DOCUMENTS

| | | | |
|---|---|---|---|
| 2014/0232831 A1* | 8/2014 | Shi | H04N 13/243 |
| | | | 348/48 |
| 2015/0348580 A1* | 12/2015 | van Hoff | G06T 3/4038 |
| | | | 348/38 |
| 2016/0191815 A1* | 6/2016 | Annau | G06T 19/006 |
| | | | 348/38 |
| 2019/0289284 A1* | 9/2019 | Smith | A61B 1/00193 |

* cited by examiner

CAMERA ARRAY FOR A MEDIATED-REALITY SYSTEM

CROSS-REFERENCE TO RELATED APPLICATIONS

This application is a continuation of U.S. application Ser. No. 16/582,855, filed Sep. 25, 2019, now U.S. Pat. No. 10,623,660 which application claims the benefit of U.S. Provisional Application No. 62/737,791 filed on Sep. 27, 2018, which is incorporated by reference herein.

BACKGROUND

Technical Field

The disclosed embodiments relate generally to a camera array, and more specifically, to a camera array for generating a virtual perspective of a scene for a mediated-reality viewer.

Description of the Related Art

In a mediated reality system, an image processing system adds, subtracts, or modifies visual information representing an environment. For surgical applications, a mediated reality system may enable a surgeon to view a surgical site from a desired perspective together with contextual information that assists the surgeon in more efficiently and precisely performing surgical tasks.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A camera array includes a plurality of hexagonal cells arranged in a honeycomb pattern in which a pair of inner cells include respective edges adjacent to each other and a pair of outer cells are separated from each other by the inner cells. A plurality of cameras is mounted within each of the plurality of hexagonal cells. The plurality of cameras includes at least one camera of a first type and at least one camera of a second type. For example, the camera of the first type may have a longer focal length than the camera of the second type. The plurality of cameras within each of the plurality of hexagonal cells are arranged in a triangular grid approximately equidistant from neighboring cameras. In an embodiment, at least one camera of the second type within each of the plurality of hexagonal cells is at a position further from or equidistant from a center point of the camera array relative to cameras of the first type.

Mediated-Reality System

Figure 1:
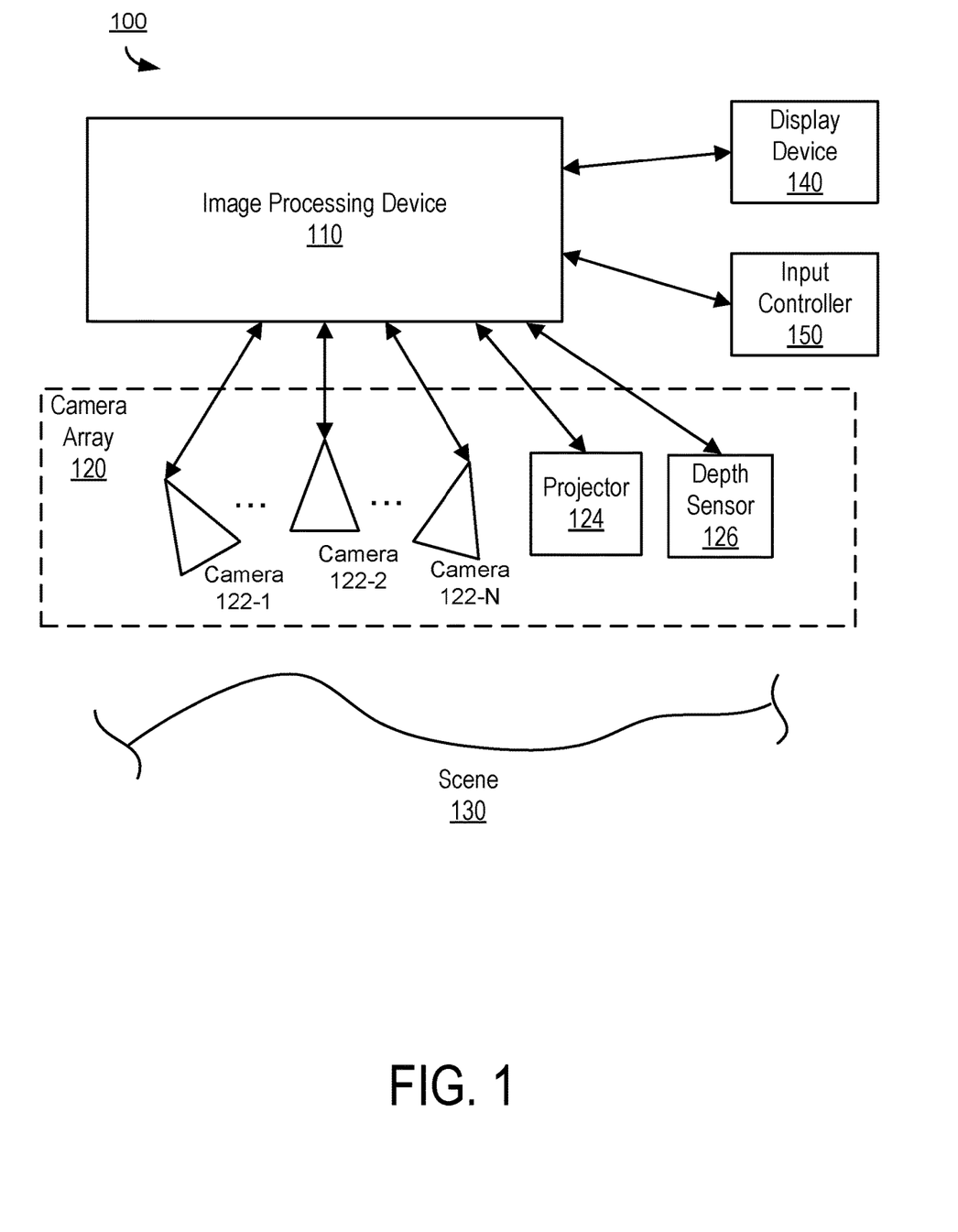
FIG. 1 is a block diagram illustrating an example embodiment of an imaging system.

FIG. 1 illustrates an example embodiment of a mediated-reality system 100. The mediated-reality system 100 comprises an image processing device 110, a camera array 120, a display device 140, and an input controller 150. In alternative embodiments, the mediated-reality system 100 may comprise additional or different components.

The camera array 120 comprises a plurality of cameras 122 (e.g., a camera 122-1, a camera 122-2, ..., a camera 122-N) that each capture respective images of a scene 130. The cameras 122 may be physically arranged in a particular configuration as described in further detail below such that their physical locations and orientations relative to each other are fixed. For example, the cameras 122 may be structurally secured by a mounting structure to mount the cameras 122 at predefined fixed locations and orientations. The cameras 122 of the camera array 120 may be positioned such that neighboring cameras may share overlapping views of the scene 130. The cameras 122 in the camera array 120 may furthermore be synchronized to capture images of the scene 130 substantially simultaneously (e.g., within a threshold temporal error). The camera array 120 may furthermore comprise one or more projectors 124 that projects a structured light pattern onto the scene 130. The camera array 120 may furthermore comprise one or more depth sensors 126 that perform depth estimation of a surface of the scene 150.

The image processing device 110 receives images captured by the camera array 120 and processes the images to synthesize an output image corresponding to a virtual camera perspective. Here, the output image corresponds to an approximation of an image of the scene 130 that would be captured by a camera placed at an arbitrary position and orientation corresponding to the virtual camera perspective. The image processing device 110 synthesizes the output image from a subset (e.g., two or more) of the cameras 122 in the camera array 120, but does not necessarily utilize images from all of the cameras 122. For example, for a given virtual camera perspective, the image processing device 110 may select a stereoscopic pair of images from two cameras 122 that are positioned and oriented to most closely match the virtual camera perspective.

The image processing device 110 may furthermore perform a depth estimation for each surface point of the scene 150. In an embodiment, the image processing device 110 detects the structured light projected onto the scene 130 by the projector 124 to estimate depth information of the scene. Alternatively, or in addition, the image processing device 110 includes dedicated depth sensors 126 that provide depth information to the image processing device 110. In yet other embodiments, the image processing device 110 may estimate depth only from multi-view image data without necessarily utilizing any projector 124 or depth sensors 126. The depth information may be combined with the images from the cameras 122 to synthesize the output image as a three-dimensional rendering of the scene as viewed from the virtual camera perspective.

In an embodiment, functions attributed to the image processing device 110 may be practically implemented by two or more physical devices. For example, in an embodiment, a synchronization controller controls images displayed by the projector 124 and sends synchronization signals to the cameras 122 to ensure synchronization between the cameras 122 and the projector 124 to enable fast, multi-frame, multi-camera structured light scans. Additionally, this synchronization controller may operate as a parameter server that stores hardware specific configurations such as parameters of the structured light scan, camera settings, and camera calibration data specific to the camera configuration of the camera array 120. The synchronization controller may be implemented in a separate physical device from a display controller that controls the display device 140, or the devices may be integrated together.

The virtual camera perspective may be controlled by an input controller 150 that provides a control input corresponding to the location and orientation of the virtual imager perspective. The output image corresponding to the virtual camera perspective is outputted to the display device 140 and displayed by the display device 140. The image processing device 110 may beneficially process received inputs from the input controller 150 and process the captured images from the camera array 120 to generate output images corresponding to the virtual perspective in substantially real-time as perceived by a viewer of the display device 140 (e.g., at least as fast as the frame rate of the camera array 120).

The image processing device 110 may comprise a processor and a non-transitory computer-readable storage medium that stores instructions that when executed by the processor, carry out the functions attributed to the image processing device 110 as described herein.

The display device 140 may comprise, for example, a head-mounted display device or other display device for displaying the output images received from the image processing device 110. In an embodiment, the input controller 150 and the display device 140 are integrated into a head-mounted display device and the input controller 150 comprises a motion sensor that detects position and orientation of the head-mounted display device. The virtual perspective can then be derived to correspond to the position and orientation of the head-mounted display device such that the virtual perspective corresponds to a perspective that would be seen by a viewer wearing the head-mounted display device. Thus, in this embodiment, the head-mounted display device can provide a real-time rendering of the scene as it would be seen by an observer without the head-mounted display. Alternatively, the input controller 150 may comprise a user-controlled control device (e.g., a mouse, pointing device, handheld controller, gesture recognition controller, etc.) that enables a viewer to manually control the virtual perspective displayed by the display device.

Figure 2:
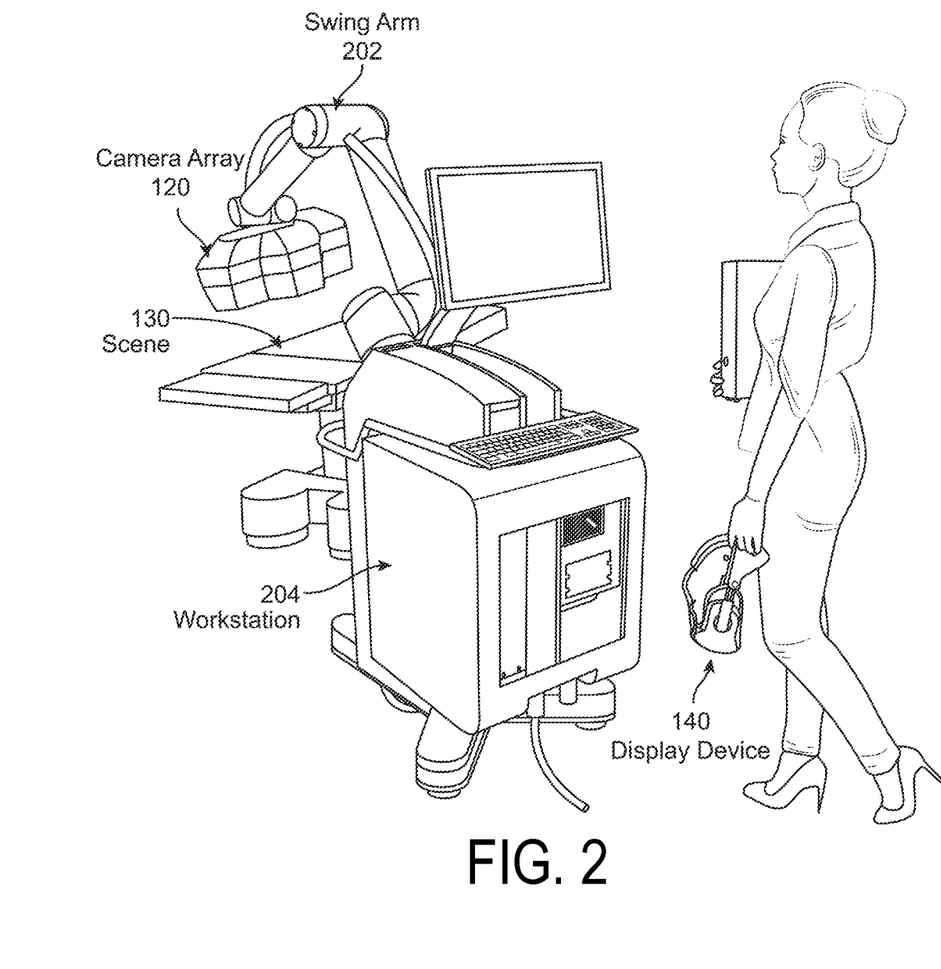
FIG. 2 is an example of a surgical environment employing the imaging system for mediated-reality assisted surgery.

FIG. 2 illustrates an example embodiment of the mediated-reality system 100 for a surgical application. Here, an embodiment of the camera array 120 is positioned over the scene 130 (in this case, a surgical site) and can be positioned via a swing arm 202 attached to a workstation 204. The swing arm 202 may be manually moved or may be robotically controlled in response to the input controller 150. The display device 140 in this example is embodied as a virtual reality headset. The workstation 204 may include a computer to control various functions of the camera array 120 and the display device 140, and may furthermore include a secondary display that can display a user interface for performing various configuration functions, or may mirror the display on the display device 140. The image processing device 120 and the input controller 150 may each be integrated in the workstation 204, the display device 140, or a combination thereof.

Figure 3:
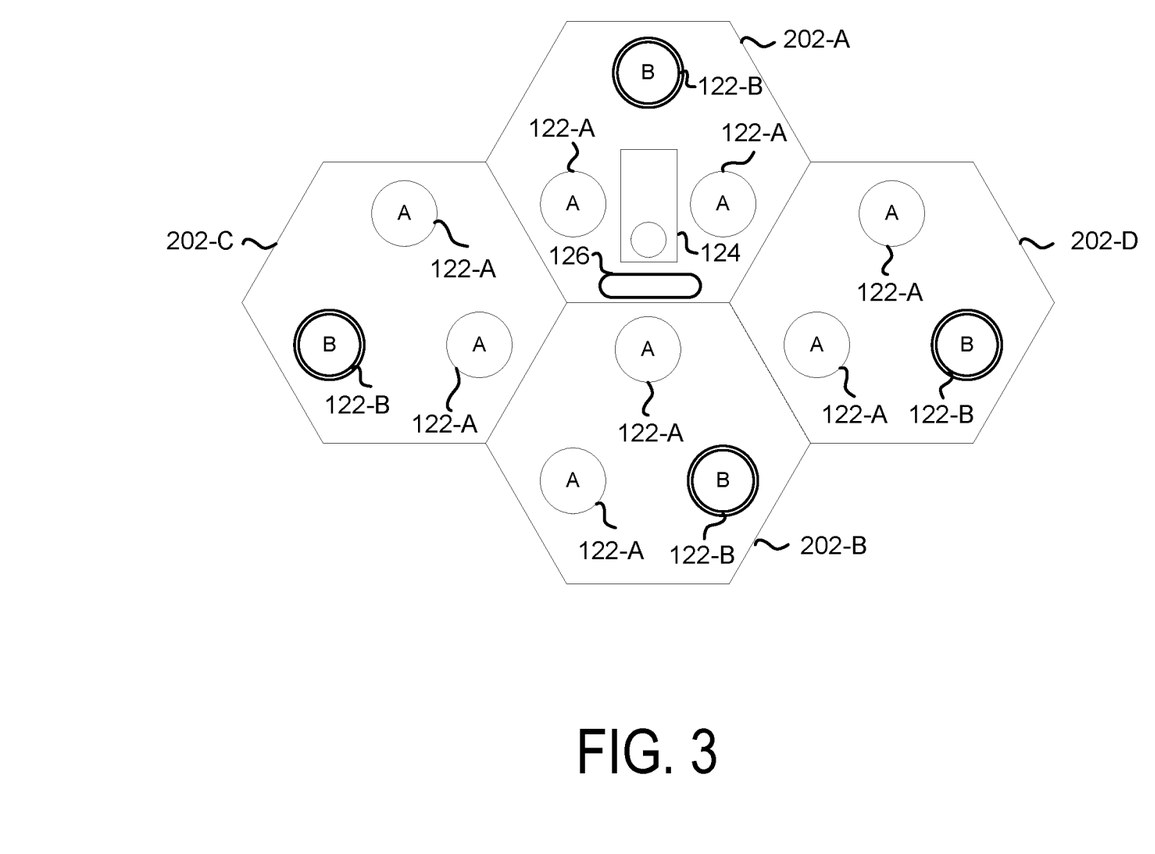
FIG. 3 is simplified cross-sectional view of an example embodiment of a camera array.

FIG. 3 illustrates a bottom plan view of an example embodiment of a camera array 120. The camera array 120 include a plurality of cells 202 (e.g., four cells) each comprising one or more cameras 122. In an embodiment, the cells 202 each have a hexagonal cross-section and are positioned in a honeycomb pattern. Particularly, two inner cells 202-A, 202-B are each positioned adjacent to other cells 202 along three adjacent edges, while two outer cells 202-C, 202-D are each positioned adjacent to other cells 202 along only two adjacent edges. The inner cells 202-A, 202-B are positioned to have respective edges adjacent to each other and may share a side wall, while the outer cells 202-C, 202-D are separated from each other (are not in direct contact). Here, the outer cells 202-C, 202-D may each have a respective pair of edges that are adjacent to respective edges of the inner cells 202-A, 202-B. Another feature of the illustrated cell arrangement is that the outer cells 202-C, 202-D each include four edges that form part of the outer perimeter of the camera array 120 and the inner cells 202-A, 202-B each include three edges that form part of the outer perimeter of the camera array 120.

The hexagonal shape of the cells 202 provides several benefits. First, the hexagonal shape enables the array 120 to be expanded to include additional cells 202 in a modular fashion. For example, while the example camera array 120 includes four cells 202, other embodiments of the camera array 120 could include, for example eight or more cells 202 by positioning additional cells 202 adjacent to the outer edges of the cells 202 in a honeycomb pattern. By utilizing a repeatable pattern, camera arrays 120 of arbitrary size and number of cameras 120 can be manufactured using the same cells 202. Furthermore, the repeatable pattern can ensure that spacing of the cameras 122 is predictable, which enables the image processor 120 to process images from different sizes of camera arrays 120 with different numbers of cameras 122 without significant modification to the image processing algorithms.

In an embodiment, the walls of the cells 202 are constructed of a rigid material such as metal or a hard plastic. The cell structure provides strong structural support for holding the cameras 122 in their respective positions without significant movement due to flexing or vibrations of the array structure.

In an embodiment, each cell 202 comprises a set of three cameras 122 arranged in a triangle pattern with all cameras 122 oriented to focus on a single point. In an embodiment, each camera 122 is approximately equidistant from each of its neighboring cameras 122 within the cell 202 and approximately equidistant from neighboring cameras 122 in adjacent cells 202. This camera spacing results in a triangular grid, where each set of three neighboring cameras 122 are arranged in triangle of approximately equal dimensions. This spacing simplifies the processing performed by the image processing device 110 when synthesizing the output image corresponding to the virtual camera perspective. The triangular grid furthermore allows for a dense packing of cameras 122 within a limited area. Furthermore, the triangular grid enables the target volume to be captured with a uniform sampling rate to give smooth transitions between camera pixel weights and low variance in generated image quality based on the location of the virtual perspective.

In an embodiment, each cell 202 comprises cameras 122 of at least two different types. For example, in an embodiment, each cell 202 includes two cameras 122-A of a first type (e.g., type A) and one camera 122-B of a second type (e.g., type B). In an embodiment, the type A cameras 122-A and the type B cameras 122-B have different focal lengths. For example, the type B cameras 122-B may have a shorter focal length than the type A cameras 122-A. In a particular example, the type A cameras 122-A have 50 mm lenses while the type B cameras 122-B have 35 mm lenses. In an embodiment, the type B cameras 122-B are generally positioned in their respective cells 202 in the camera position furthest from a center point of the array 120.

The type B cameras 122-B have a larger field-of-view and provide more overlap of the scene 130 than the type A cameras 122-A. The images captured from these cameras 122-B are useful to enable geometry reconstruction and enlargement of the viewable volume. The type A cameras 122-A conversely have a smaller field-of-view and provide more angular resolution to enable capture of smaller details than the type B cameras 122-B. In an embodiment, the type A cameras occupy positions in the center of the camera array 120 so that when points of interest in the scene 150 (e.g., a surgical target) are placed directly below the camera array 120, the captured images will benefit from the increased detail captured by the type A cameras 122-A relative to the type B cameras 122-B. Furthermore, by positioning the type B cameras 122-B along the exterior of the array 120, a wide baseline between the type B cameras 122-B is achieved, which provides the benefit of enabling accurate stereoscopic geometry reconstruction. For example, in the cells 202-A, 202-C, 202-D, the type B camera 122-B is at the camera position furthest from the center of the array 120. In the case of a cell 202-B having two cameras equidistant from the center point, one of the camera positions may be arbitrarily selected for the type B camera 122-B. In an alternative embodiment, the type B cameras 122-B may occupy the other camera position equidistant from the center of the array 120.

In an embodiment, the camera array 120 further includes a projector 124 that can project structured light onto the scene 130. The projector 124 may be positioned near a center line of the camera array 120 in order to provide desired coverage of the scene 130. The projector 124 may provide illumination and project textures and other patterns (e.g., to simulate a laser pointer or apply false or enhanced coloring to certain regions of the scene 150). In an embodiment, the camera array 120 may also include depth sensors 126 adjacent to the projector 124 to use for depth estimation and object tracking.

Figure 4:
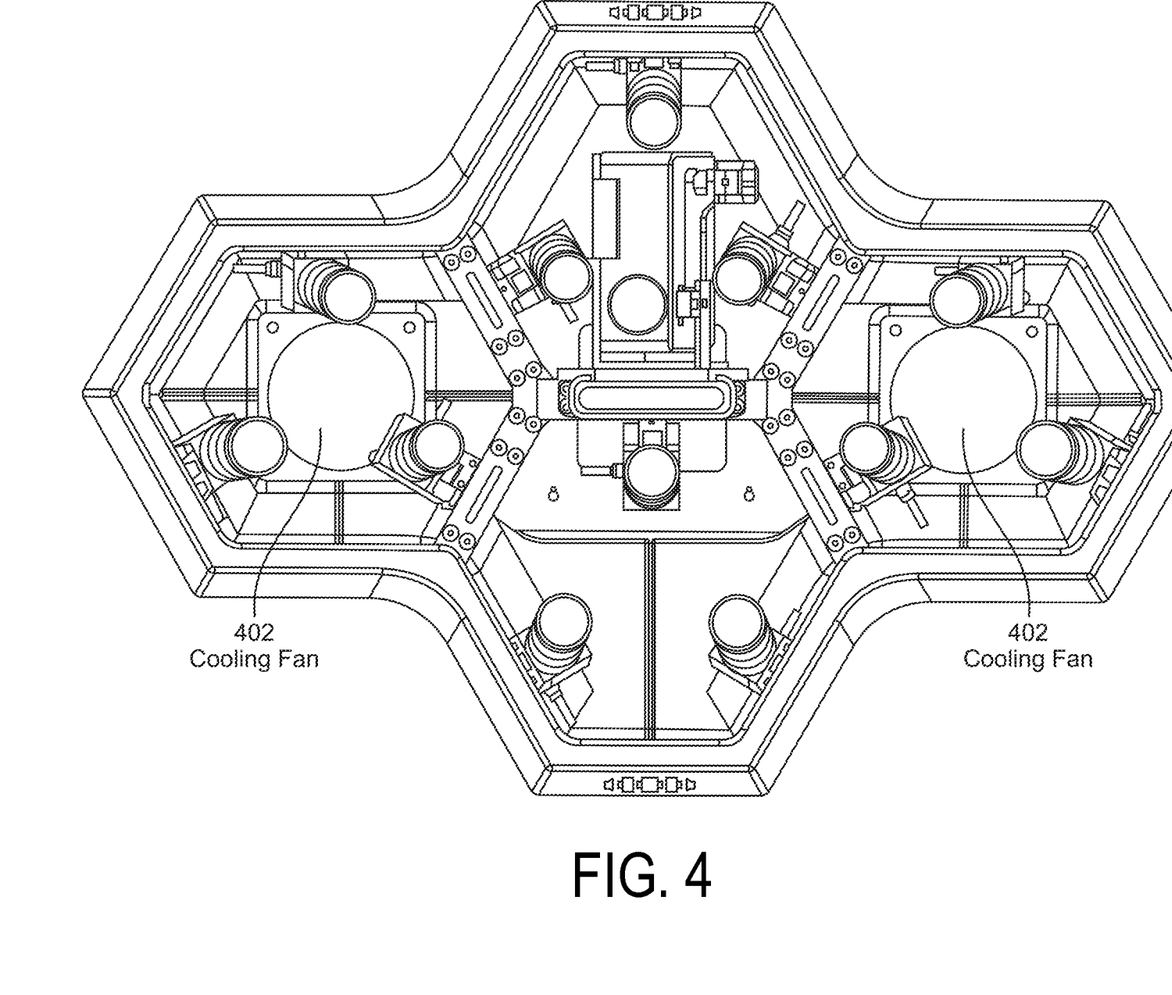
FIG. 4 is a detailed bottom view of an example embodiment of a camera array.

FIG. 4 illustrates a more detailed bottom plan view of an embodiment of a camera array 120. In this view, the orientation of the cameras can be seen as pointing towards a centrally located focal point. Furthermore, in this embodiment, the type A cameras 122-A are 50 mm focal length cameras and the type B cameras 122-B are 35 mm focal length cameras. As further illustrated in this view, an embodiment of the camera array 120 may include one or more cooling fans to provide cooling to the camera array 120. For example, in one embodiment, a pair of fans may be positioned in the outer cells 202-C, 202-D of the camera array 120. In an alternative embodiment, the camera array 120 may incorporate off-board cooling via tubing that carries cool air to the camera array 120 and/or warm air away from the camera array 120. This embodiment may be desirable to comply with restrictions on airflow around a patient in an operating room setting.

Figure 5:
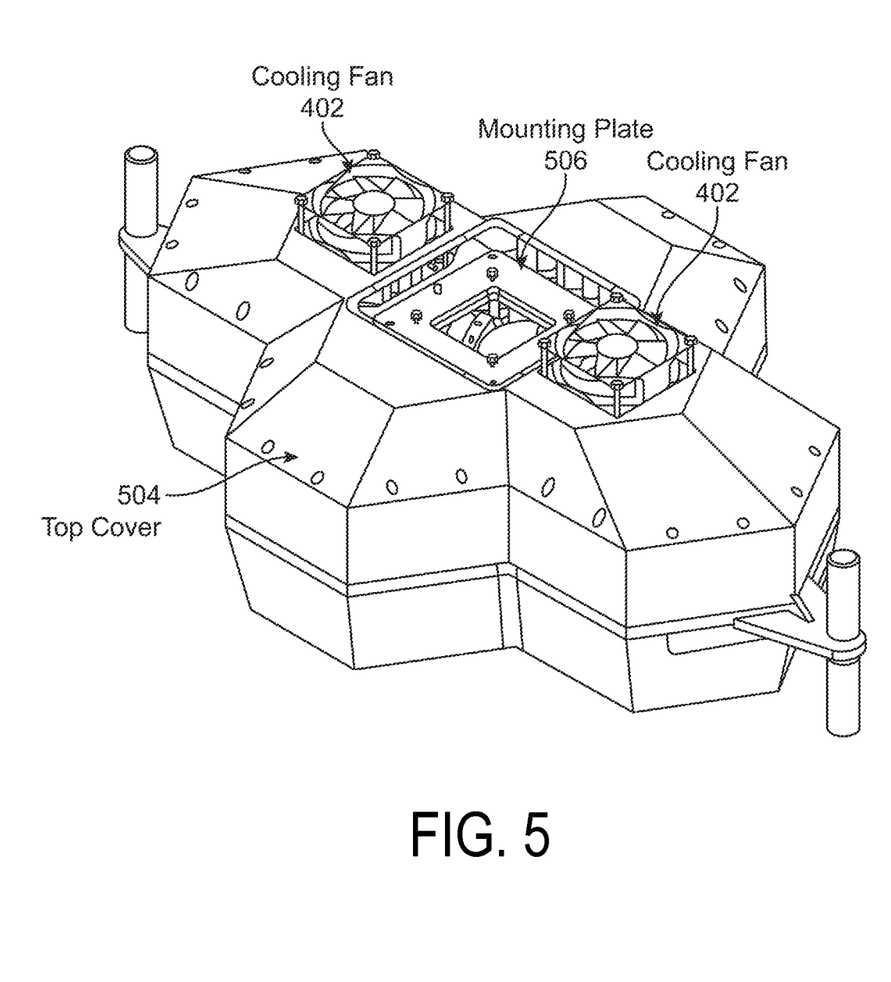
FIG. 5 is a top perspective view of an example embodiment of a camera array.

FIG. 5 illustrates a perspective view of the camera array 120. In this view, a top cover 504 is illustrated to cover the hexagonal cells 202 and provide structural support to the camera array 120. Additionally, the top cover may include a mounting plate 506 for coupling to a swing arm 202 as illustrated in FIG. 2. The top cover 504 may further include mounting surfaces on the outer cells 202-C, 202-D for mounting the fans 402.

Upon reading this disclosure, those of skill in the art will appreciate still additional alternative structural and functional designs for the disclosed embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and system disclosed herein without departing from the scope of the described embodiments.

The invention claimed is:

1. A mediated-reality system, comprising:
   a camera array to capture a plurality of images of a scene, the camera array including:
   a rigid frame having walls structured to form a plurality of cells having a substantially same shape;
   a plurality of cameras mounted within each of the plurality of cells and arranged in a same pattern within each of the plurality of cells, the plurality of cameras including at least one camera of a first focal length and at least one camera of a second focal length different than the first focal length, wherein the first focal length is longer than the second focal length, and at least one camera of the second focal length within each of the plurality of cells is at a position further from or equidistant from a center point of the camera array relative to cameras of the first focal length;
   an input controller to control a position and orientation of a virtual perspective of the scene;
   an image processing device to synthesize a virtual image corresponding to the virtual perspective based on the plurality of images of the scene; and
   a display device to display the virtual image.

2. The camera array of claim 1, wherein the camera of the first focal length comprises a 50 mm camera and wherein the camera of the second focal length comprises a 35 mm camera.

3. The camera array of claim 1, further comprising:
   a projector to project structured light onto a scene that within a field of view of the plurality of cameras.

4. The camera array of claim 1, further comprising:
   a depth sensor for sensing depth of a surface of a scene within a field of view of the plurality of cameras.

5. The camera array of claim 1, further comprising:
   a cooling system to provide cooling to the plurality of cameras.

6. The camera array of claim 1, further comprising a swing arm to position the plurality of cameras in a desired position and orientation.

7. A camera array comprising:
   a rigid frame having walls structured to form a plurality of cells having a substantially same shape;
   a plurality of cameras mounted within each of the plurality of cells and arranged in a same pattern within each of the plurality of cells, the plurality of cameras including at least one camera of a first focal length and at least one camera of a second type focal length different than the first focal length, wherein the first focal length is longer than the second focal length, and at least one camera of the second type within each of the plurality of cells is at a position further from or equidistant from a center point of the camera array relative to cameras of the first type.

8. The camera array of claim 7, wherein the camera of the first type comprises a 50 mm camera and wherein the camera of the second type comprises a 35 mm camera.

9. The camera array of claim 7, further comprising: a projector to project structured light onto a scene that within a field of view of the plurality of cameras.

10. The camera array of claim 7, further comprising: a depth sensor for sensing depth of a surface of a scene within a field of view of the plurality of cameras.

11. The camera array of claim 7, further comprising: a cooling system to provide cooling to the plurality of cameras.

12. The camera array of claim 7, further comprising a swing arm to position the plurality of cameras in a desired position and orientation.

13. A mediated-reality system, comprising:
a camera array to capture a plurality of images of a scene, the camera array including:
a plurality of cells; and
a plurality of cameras mounted within each of the plurality of cells, the plurality of cameras including at least one camera of a first type and at least one camera of a second type different than the first type, wherein the plurality of cameras within each of the plurality of cells are arranged in a triangular grid approximately equidistant from neighboring cameras;
an input controller to control a position and orientation of a virtual perspective of the scene;
an image processing device to synthesize a virtual image corresponding to the virtual perspective based on the plurality of images of the scene; and
a display device to display the virtual image.

14. The mediated-reality system of claim 13, wherein the at least one camera of the second type within each of the plurality of cells is at a position further from or equidistant from a center point of the camera array relative to cameras of the first type.

15. The mediated-reality system of claim 13, wherein the at least one camera of the first type has a longer focal length than the at least one camera of the second type.

16. The mediated-reality system array of claim 13, further comprising:
a projector to project structured light onto a scene that within a field of view of the plurality of cameras.

17. The mediated-reality system of claim 13, further comprising:
a depth sensor for sensing depth of a surface of a scene within a field of view of the plurality of cameras.

18. The mediated-reality system of claim 13, further comprising:
a cooling system to provide cooling to the plurality of cameras.

19. A mediated-reality system, comprising:
a camera array to capture a plurality of images of a scene, the camera array including:
a rigid frame having walls structured to form a plurality of cells having a substantially same shape;
a plurality of cameras mounted within each of the plurality of cells and arranged in a same pattern within each of the plurality of cells, the plurality of cameras including at least one camera of a first focal length and at least one camera of a second focal length different than the first focal length, wherein the camera of the first focal length comprises a 50 mm camera and wherein the camera of the second focal length comprises a 35 mm camera;
an input controller to control a position and orientation of a virtual perspective of the scene;
an image processing device to synthesize a virtual image corresponding to the virtual perspective based on the plurality of images of the scene; and
a display device to display the virtual image.

20. A camera array comprising:
a rigid frame having walls structured to form a plurality of cells having a substantially same shape;
a plurality of cameras mounted within each of the plurality of cells and arranged in a same pattern within each of the plurality of cells, the plurality of cameras including at least one camera of a first focal length and at least one camera of a second focal length different than the first focal length, wherein the camera of the first focal length comprises a 50 mm camera and wherein the camera of the second focal length comprises a 35 mm camera.

* * * * *